Aug. 16, 1927.

C. R. SODERBERG 1,638,889

VIBRATION ABSORBER

Filed July 11, 1924

WITNESSES:
R. J. Butler.
S. M. Pineles

INVENTOR
Carl R. Soderberg.
BY
Wesley G. Carr
ATTORNEY

Patented Aug. 16, 1927.

1,638,889

UNITED STATES PATENT OFFICE.

CARL RICHARD SODERBERG, OF EDGEWOOD PARK, PENNSYLVANIA, ASSIGNOR TO WESTINGHOUSE ELECTRIC & MANUFACTURING COMPANY, A CORPORATION OF PENNSYLVANIA.

VIBRATION ABSORBER.

Application filed July 11, 1924. Serial No. 725,382.

My invention relates to vibration absorbers and it has particular relation to vibration absorbers for reducing the magnitude of the vibratory forces exerted by dynamo-electric machines upon the foundations supporting the same.

In my copending application, Serial No. 703,830, filed April 2, 1924 and assigned to the Westinghouse Electric & Manufacturing Company, I have disclosed the principles of design of operative vibration absorbers of the above-mentioned character and I have particularly pointed out that in cases where the vibratory forces exerted by machines supported upon the foundation are of a torsional character, it is necessary to provide a yieldable support for the machine at diametrically opposite points in a plane through the axis of rotation of the machine in order to prevent the introduction of translational forces tending to displace the machine from its central position.

While the provision of properly located supporting members is feasible and practical in machines designed especially for the particular service, it is nevertheless desirable to apply vibration absorbers to existing machinery that was originally constructed with the conventional supporting legs or brackets at the base.

One object of my invention is, therefore, to provide vibration absorbers, for machines exposed to pulsatory torsional forces, comprising means for yieldably supporting the machine from non-diametrically related points while preventing radial movement of the machine.

Another object of my invention is to provide, in a machine of the above-described character, spring members acting as a yieldable support in a circumferential direction and as a substantially rigid support in a radial direction.

With the foregoing and other objects in view, my invention comprises the organizations and details of construction described and claimed hereinafter and illustrated in the accompanying drawing, wherein—

Figure 1:
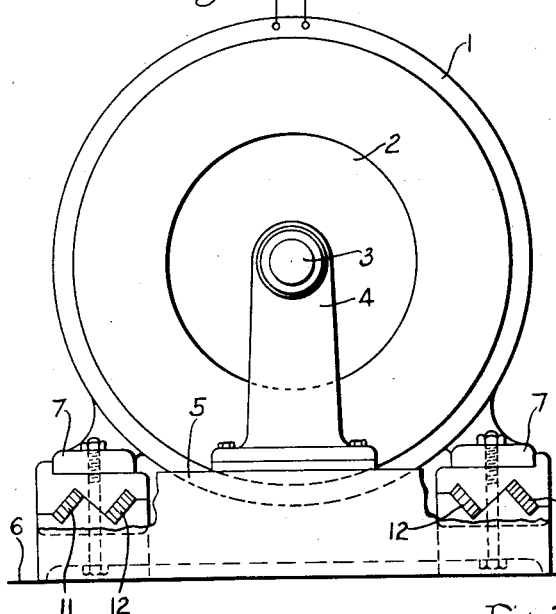
Figure 2:
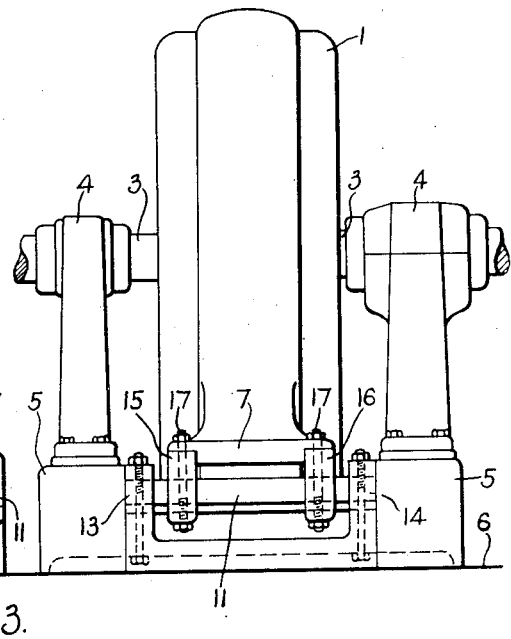
Figure 3:
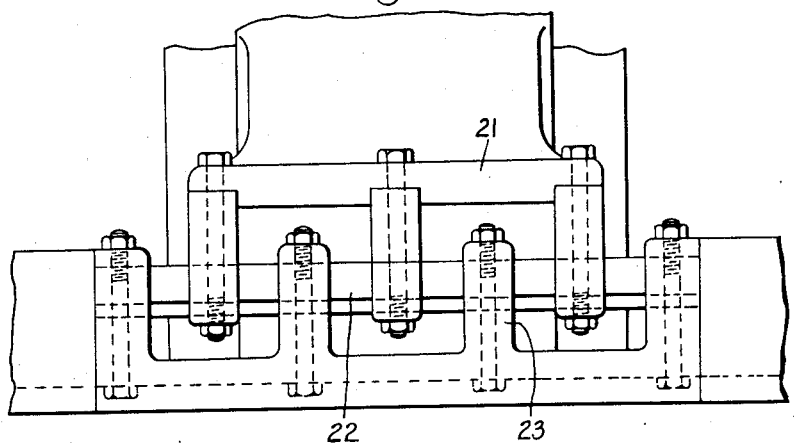

Figure 1 is a view in elevation illustrating a dynamo-electric machine provided with vibration absorbers made according to my invention, Fig. 2 is a side view of the machine shown in Fig. 1, and Fig. 3 is a view similar to Fig. 2 showing a modification of my invention.

Referring to Figs. 1 and 2, a single-phase dynamo-electric machine comprises a stator member 1 and a concentrically mounted rotor member 2. The rotor member 2 is carried upon a shaft 3 that is supported upon pedestal bearings 4 rigidly mounted upon the bed plate 5 constituting a part of the foundation 6. The stator is provided with non-diametrically disposed supporting brackets or legs 7 located near the base thereof as is usual in the conventional type of machines. According to my invention, the stator legs 7 are secured to the bed plate 5 in a novel manner as described hereinafter.

The power flowing through the single-phase dynamo-electric machine is of pulsatory character on account of the single-phase currents flowing in the same and, accordingly, the reactional forces exerted by the stator 1 through the supporting legs 7 upon the bed plate 5 will also be pulsatory and may seriously affect the operation of the machine. The problem of reducing the magnitude of the pulsations transmitted upon the foundations becomes particularly serious in connection with low-speed, large-capacity machines on account of the magnitude of the forces and also because, in many such cases, the period of the impressed vibrations comes very near to the natural period of vibration of the mechanical system comprising the machine and its mounting.

The principal novel feature of my invention is the mounting of the legs 7 upon the bed plate 5 whereby the stator is permitted a slight circumferential movement for reducing the magnitude of the pulsatory forces transmitted upon the foundation while, at the same time, preventing radial movement of the stator 1. It is readily realized that even a slight radial movement of the stator would be disastrous for the machine on account of the possible collision between the rotor 2 and the stator 1.

I am aware of prior constructions wherein it has been proposed to mount the stator upon bearings surrounding the shaft 3 of the rotor and thereby positively prevent the dislocation of the stator as against the rotor. In such prior constructions, however, the stator exerts, through the bearings, a pulsatory force upon the shaft, and may thereby produce oscillations of the mechanical system composed of the rotor, the rotor shaft and the bearings which very often will prove more objectionable than the vibrations that were intended to be suppressed originally. Furthermore, the cost and space requirements of such prior constructions make their use in large machines prohibitive.

According to my invention, it is not necessary to provide special end brackets upon the stator for securing the centralization of the stator and the shaft, although my invention may be effectively used in connection with such brackets if so desired.

In carrying out my invention I support each of the legs 7 upon a pair of beam springs 11 and 12, which are clamped to the bed plate 5, at 13 and 14, in a somewhat tilted position. The beam springs 11 and 12 are disposed parallel to the shaft 3 and are of rectangular cross section. The sides of the rectangle constituting the cross section of the beam springs are of relatively great length compared to the thickness of the springs and are disposed in a substantially radial direction with respect to the center of the machine, so that the springs are flexible in a circumferential direction but have a very low flexibility in a radial direction. The legs 7 of the stator are secured upon the springs 11 and 12, at points intermediate of the supports 13 and 14, by means of clamping members 15 and 16 and bolts 17.

In the preferred construction shown in Figs. 1 and 2, the beam springs 11 and 12 are supported upon the foundation at their end portions and are "doubly loaded," by which I mean that they are loaded at two points intermediate their ends. The same effect will be secured, of course, by changing the relative locations of the points at which the springs are secured to the stator and to the foundation, respectively, but the construction shown in the drawing appears to be more advantageous.

When torsional forces act through the legs 7 upon the springs 11 and 12, the same will, in general, have a tendency to be deflected in a direction different from the circular direction. The forces acting upon each supporting point may be resolved into components acting in a circumferential direction and components acting in a radial direction.

With the location of the supporting points of the stator shown in the drawing, the components into which the torsional forces have been resolved are smaller than the original forces themselves. The circumferentially acting components will be cushioned by the springs 11 and 12. The components acting in radial directions are not materially cushioned since the springs 11 and 12 act as a substantially rigid support for radially acting forces. Since, however, the components of the force are smaller than the original force itself, the magnitude of the uncushioned force transmitted to the foundation is now smaller than the original force that would be transmitted were no vibration absorbers provided.

I do not desire to be restricted to the particular details of construction illustrated and described hereinbefore. For instance, instead of providing doubly loaded springs, I may clamp the stator leg 21 to the supporting springs 22 at three or more points, as shown in Fig. 3. Similarly, the springs may be supported upon the bed plate 5 at a number of intermediate points 23.

The essential features of my invention may be incorporated in many different designs and may be utilized in other machines. I desire, therefore, that the language of the appended claims shall be awarded the broadest construction consistent with the prior art.

I claim as my invention:

1. The combination with a dynamo-electric machine having a stator and a rotor, said stator being exposed to pulsating torsional forces, of a foundation, rotor-supporting bearings rigidly supported upon said foundation, and a spring mounting constituting the sole support of said stator upon said foundation and comprising non-diametrically disposed stator legs and beam springs secured to said legs and said foundation at spaced points, respectively, said springs being disposed parallel to the stator axis and having a rectangular cross section of which two sides are disposed in a substantially radial direction with respect to the center of the machine and are longer than the other sides.

2. The combination with a machine having a stator and a concentric rotor, said stator being exposed to pulsating torsional forces, of a foundation, a spring mounting comprising non-diametrically disposed stator legs, and beam springs secured at spaced points to said legs and said foundation, respectively, said springs being disposed substantially parallel to the stator axis and having a rectangular cross section of which two sides are disposed in a substantially radial direction with respect to the center of the machine and are longer than the other sides.

In testimony whereof, I have hereunto subscribed my name this 23rd day of June, 1924.

CARL RICHARD SODERBERG.